Figure 1:
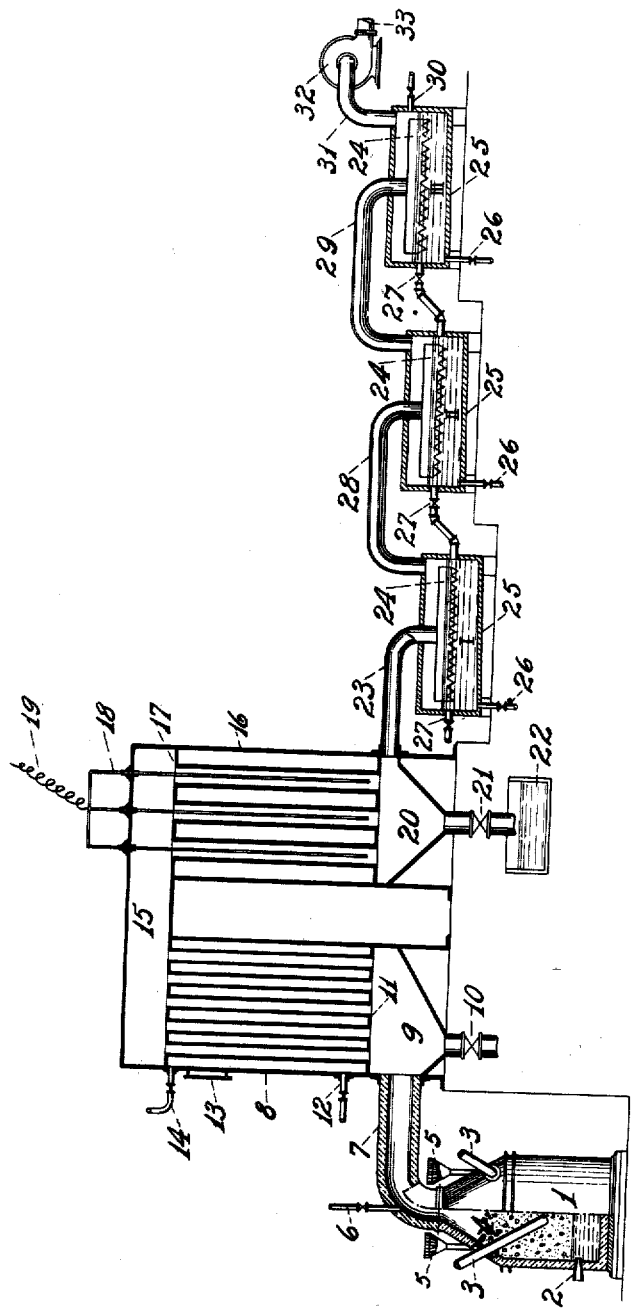

I. HECHENBLEIKNER.
COOLING AND CONDENSING GASES.
APPLICATION FILED FEB. 10, 1917.

1,264,511.

Patented Apr. 30, 1918.

Witnesses:

Inventor;
By his Attorneys,

UNITED STATES PATENT OFFICE.

INGENUIN HECHENBLEIKNER, OF CHARLOTTE, NORTH CAROLINA, ASSIGNOR TO SOUTHERN ELECTRO-CHEMICAL COMPANY, OF NEW YORK, N. Y., A CORPORATION OF NEW JERSEY.

COOLING AND CONDENSING GASES.

1,264,511.　　　　Specification of Letters Patent.　　Patented Apr. 30, 1918.

Application filed February 10, 1917. Serial No. 147,962.

*To all whom it may concern:*

Be it known that I, INGENUIN HECHENBLEIKNER, a citizen of the United States, residing a Charlotte, in the county of Mecklenburg and State of North Carolina, have invented certain new and useful Improvements in Cooling and Condensing Gases, of which the following is a specification.

This invention relates to the treatment of gases, and has particular application to an improved method for cooling and condensing such gases as are produced in the manufacture of phosphoric acid by the electric furnace process.

In my co-pending application, filed February 10, 1917, Ser. No. 147,961, I have shown and described a method and apparatus for treating gases of this character to separately produce commercial phosphoric acid through the employment of electrical precipitation and to produce commercially pure hydrofluosilicic acid in an absorption system operating on the counter current principle.

In the apparatus illustrated in said co-pending application the heat developed by the combustion of phosphorus and carbon-monoxid is utilized in a rotary kiln to preheat the down-coming charge of sand and phosphate rock, the gases passing through the kiln being cooled or reduced to a lower temperature to a marked degree in the latter.

As contradistinguished from the apparatus and method set forth in the said co-pending application, I, in the present instance, pass the gases after they leave the electric furnace into and through a steam boiler where the temperature of the gases is not only lowered, but steam is generated which may be subsequently used as the motive power for driving an engine employed in furnishing power for the electric generating apparatus of the furnace, thus producing an exceedingly compact and economical arrangement.

Furthermore, it is my purpose to provide an arrangement for feeding the charging mixture of phosphate rock and coke directly into the furnace and around the electrodes thereof, said furnace being preferably substantially air-tight, so as to prevent the air-burning of the electrodes.

Another object of the invention is the provision of an apparatus wherein the dust of the gases leaving the furnace may be collected in the bottom section or combustion chamber of the steam boiler, the gases thus freed from dust being subsequently subjected in a continuous process to the action of an electric precipitator and to absorption devices preferably operating on the counter-current principle for the purpose of precipitating the phosphorus pentoxid solids and for condensing and producing pure hydrofluosilicic acid respectively.

It is also my purpose to provide a compact and efficient form of apparatus through the medium of which the valuable components of the gases produced in the furnace may be condensed, eliminated and saved from the stream of gases so that such residual vapors or gases as are allowed to escape or waste in the atmosphere will not only be free from commercially valuable matter, but will be harmless to injure the surrounding territory or vegetation.

With the above recited objects and others of a similar nature in view my invention consists in the method set forth in and falling within the scope of the appended claims.

In the accompanying drawings,

The figure is a sectional view of one form of apparatus for carrying out my method.

In the drawing, the numeral 1 indicates an electric furnace provided with a tap nozzle 2 for the removal of slag and with the usual electrodes 3 to which the electric current is supplied in any suitable manner for the purpose of generating heat to fuse the charge 4 surrounding the electrodes. This charge, as is usual in processes of this character, is composed of phosphatic material, such as mineral phosphate rock, sand and a carbonaceous material, such as coke, coal or the like. The furnace is preferably made as air-tight as possible, and the mixture or charge may be introduced thereto through the feed hoppers 5, the gases generated in the furnace passing up through a flue or duct 7 into the lower section or combustion chamber 9 of the steam boiler 8, an air pipe line 6, preferably provided with a suitable valve, being employed for regulating the amount of air admitted to the flowing stream of gases issuing from the furnace for the purpose of suitably oxidizing such gases. The bottom section 9 of the steam boiler terminates at its lower end in a valved discharge pipe 10 through which the dust settling in the hopper bottom may be removed. The steam boiler 8 may be of any type of boiler suitable for the purpose, in the present instance a water tube boiler, the water tubes being conventionally shown at 11, and are supplied with water through the water feed line 12, a gage 13 being positioned as is usual upon the boiler, while the numeral 14 indicates the steam outlet pipe through which steam may pass from the upper head end of the boiler to any suitable point of use, such as an engine employed for driving a dynamo or the like, which in turn may constitute a part of the current generating equipment of the furnace. The gases flow from the furnace into the bottom or chamber 9 of the boiler and thence up and through the spaces between the water tubes and so on to the conduit 15 which connects the upper end of the boiler with the electric precipitator 16. This latter which may be of any type, is herein shown as embodying a shell or casing provided with spaced tubes or pipes 17 into which project the precipitator electrodes 18 which are supplied with current through any suitable electric conductor indicated at 19. The bottom of this precipitator is formed with a hopper 20 for removing precipitated solids such as the phosphorus pentoxid solids which under the electrical action are deposited on the pipes or tubes 17. Such deposited solids may be removed from the bottom 20 through the valved pipe 21, and permitted to pass into the receptacle 22 containing water, the phosphorus pentoxid combining with the water to produce liquid phosphoric acid. After the phosphoric pentoxid has been precipitated the remaining gases pass from the precipitator through the connecting pipe 23 into the first scrubbing box 1. As will be seen by reference to the drawing there are three of these scrubbing boxes indicated by the Roman numerals I, II and III respectively, and these boxes are arranged in series and in spaced relation. Each comprises an inclosed gas-tight box 25 containing the absorption liquid, and each box is provided with a gas hood 24 having a saw tooth rim for gas distribution. A drain valve 26 is arranged at the lowest part of each box, while at 27 I have shown the acid pipe line leading from one box to another. As above mentioned, the precipitator is connected with the scrubbing box I by a gas conduit 23, while gas conduit 28 connects the boxes I and II and a gas conduit 29 similarly connects the boxes II and III. Water is supplied to the box III through the pipe line 30, and the gas outlet from the scrubbing box III leads through a gas conduit 31 to the exhaust fan 32 which discharges into the atmosphere.

The above is a description of the structural features of one form of apparatus which may be employed in the practice of the invention, and the operation may be briefly recited as follows:

A furnace charge consisting of phosphate rock, sand and coke is fed into the electric furnace and around the electrodes 3 through the hoppers 5 and as it is melted down the slag pours continuously out through the tap nozzle 2 while the generated gases escaping from the furnace are oxidized by oxygen gases such as air admitted through the pipe 6 in suitable quantities. The gases leaving the furnace contain very little dust because of the arrangement and manner of admitting the charge to the furnace, and the movement of the gas through the entire apparatus is influenced or accomplished by the exhaust fan 33 which creates a vacuum on the top of the furnace and permits of the introduction of a regulated amount of air for the necessary combustion of the gases. The combustion of the gases is completed in the combustion and dust settling chamber 9 at the bottom of the steam boiler, wherein most of the dust is also separated from the gases by the lowering of the velocity of the latter. As the gases pass up through the boiler they cool off, heating the water admitted to the boiler tubes through the feed water pipe 12, thus producing steam which may be conducted from the boiler through the pipe 14 for the purpose hereinbefore mentioned. As the gases pass through the boiler and before they reach the electric precipitator they cool down to a temperature which will not be detrimental or destructive to the material of which the precipitator is constructed. In the electric precipitator the phosphorus pentoxid ($P_2O_5$) is separated or precipitated, and as a solid may be removed through the hopper bottom 20 and deposited in the water contained in the receptacle 22, thus producing commercial phosphoric acid. With the phosphorus pentoxid removed by the action of the electric precipitator the residue gases which now contain mainly silicon tetrafluorid, nitrogen, oxygen and carbon dioxid pass to and through the scrubbing tanks or boxes. These scrubbing boxes are arranged in series so the gases are treated on the counter-current principle, the acid flowing in a direction opposite to the flow of the gases and by gravity from box III to box II to box I and thence through the pipe 27 of the latter to the point of discharge or collection. Water is added in the box III and flows through the pipe 27 to the box II as diluted acid, is concentrated in box II and flows through connecting pipe 27 to box I, where it is concentrated to a still greater extent and finally leaves the system by the overflow pipe of box I, as pure hydrofluosilicic acid $H_2SiF_6$, gelatinous silicic acid ($H_2SiO_3$) forming in these boxes and settling to the bottom where it can be removed from time to time through the drain valves 26 without disturbing the operation of the process. The hydrofluosilicic acid ($H_2SiF_6$) overflowing in the pipes 27 therefore is pure and is separated automatically from the gelatinous silicic acid ($H_2SiO_3$) and the gases then leaving the absorption system by the discharge 33 are entirely free from harmful acid gases while containing no by-products of commercial value.

Thus it will be noted that through such an apparatus as I have described, I may practise my method so that I am enabled to remove from the gases generated in the furnace such products as are commercially valuable, and which might, under conditions, be detrimental to the surrounding territory if permitted to escape or waste in the atmosphere.

While I have herein shown and described a preferred embodiment of my invention I wish it to be understood that I do not confine myself to all the precise details set forth by way of illustration, as modifications and variation may be made without departing from the spirit of the invention or exceeding the scope of the appended claims.

What I claim is:

1. The herein described method of treating gases which consists in first water cooling the gases, then electrically precipitating the gases thus cooled to solidify and remove certain of the components thereof, and subsequently subjecting the residual gases to absorption and condensation.

2. The herein described method of treating gases which consists in first passing such gases through a chamber having water containing units therein whereby said gases are cooled, then subjecting said gases to electrical precipitation to precipitate certain components of the gases as a solid, bringing the said solid into contact with water, and thence subjecting the residual gases to absorption and condensation.

3. The herein described method of treating gases containing phosphorus pentoxid and silicon fluorid which consists in passing the gases in the heated state through a chamber in contact with water cooled units whereby the said gases are preliminarily cooled and the dust of the gases collected, then electrically precipitating the phosphorus pentoxid as a solid, bringing the same into contact with water to produce phosphoric acid, and then subjecting the residual gases containing calcium fluorid to the action of an absorption and condensation system to produce hydrofluosilicic acid.

In testimony whereof I affix my signature.

INGENUIN HECHENBLEIKNER.